United States Patent [19]

Beane

[11] 4,023,944
[45] May 17, 1977

[54] FILTER UNIT

[75] Inventor: Bennie J. Beane, Wilmington, N.C.

[73] Assignee: General Electric Company, San Jose, Calif.

[22] Filed: Apr. 22, 1976

[21] Appl. No.: 679,209

[52] U.S. Cl. .......................... 55/481; 55/482; 55/493; 55/502; 55/504; 55/509; 55/DIG. 9; 292/256.75

[51] Int. Cl.² .................................. B01D 46/00

[58] Field of Search ............. 55/97, 478, 480, 481, 55/482, 493, 497, 499, 500, 504, 502, 511, 509, DIG. 9; 292/256.75

[56] References Cited

UNITED STATES PATENTS

| 1,047,588 | 12/1912 | Stull | 292/256.75 |
|---|---|---|---|
| 1,990,110 | 2/1935 | Bridges | 55/509 |
| 2,804,165 | 8/1957 | Blomgren et al. | 55/480 |
| 3,354,616 | 11/1967 | Lucas | 55/97 |
| 3,423,908 | 1/1969 | Hart | 55/502 |
| 3,668,843 | 6/1972 | Westlin et al. | 55/501 |
| 3,816,984 | 6/1974 | Neumann | 55/481 |

FOREIGN PATENTS OR APPLICATIONS

| 1,451,456 | 7/1966 | France | 55/497 |
|---|---|---|---|
| 1,091,415 | 10/1960 | Germany | 55/480 |

*Primary Examiner*—Bernard Nozick
*Attorney, Agent, or Firm*—Ivor J. James, Jr.; Sam E. Laub; Samuel E. Turner

[57] ABSTRACT

A filter unit adapted for receiving a flow of fluid potentially carrying particulate material and for holding filters transverse to the flow is disclosed, and in one preferred application of the invention the flow is an air stream containing radioactive particles. The filter unit has a generally cubic-shaped housing having a fluid inlet opening and a fluid outlet opening in two opposite surfaces and preferably these openings are provided with flanges. The housing is also provided in its lateral surfaces with a first opening and a second opening enabling insertion and removal of filters though these openings. The openings are preferably in the same lateral surface or wall. Each opening has a door means mounted to close the opening with each door means being capable of being opened at least 90° to the lateral surface of the housing on which the door means is mounted. The housing also has a clamping means near the first opening and a clamping means near the second opening for securing each door means to the housing to close the associated opening. One door means has attached on the inside surface a platform with two apertures for receiving two indexing studs upon closing and clamping the door to the housing. The other door means has the inside surface forming a filter changing catch pan for collecting and holding particulate material as well as supporting the filter during changing thereof. The housing also has two means for receiving and securely holding filters inside the housing adjacent each opening, and one of the means for receiving and securely holding a filter is a pressure frame means having two indexing studs mounted thereon for engaging respectively the two apertures for receiving the two indexing studs in the platform. Two embodiments of the pressure frame means are presented.

19 Claims, 7 Drawing Figures

FILTER UNIT

BACKGROUND OF THE INVENTION

This invention relates to a housing for holding replaceable filters and in greater detail relates to a housing for holding multiple replaceable filters with one such filter preferably being a high efficiency particulate air (HEPA) filter used for filtering gases to remove extremely small particles, particularly small radioactive particles in an air stream, with the other filter being a preliminary filter usually replaced more frequently than the high efficiency particulate air filter.

High efficiency particulate air filters are commonly used in industry for removing particulate materials from fluid streams such as air streams, particularly when the particulate material has a high economic value or is potentially harmful when released to the atmosphere, such as a radioactive material. These filters are termed "absolute" because these filters effect a substantially total separation of particles from the gas flow, usually an air flow.

These absolute filters are customarily used by being mounted in a mounting means or a means for receiving and holding such filters inside a container or housing and capable of being replaced along with one or more other filters such as a preliminary filter mounted in a mounting means inside the housing for ease of replacement, the combination being referred to as a "filter unit." Typically the filter unit has the replaceable filters positioned in a rigid metal housing generally perpendicular to the path of flow of the fluid to be filtered through the rigid housing. The filters are sealed against a frame-shaped pressure surface located in the housing to prevent any by-pass of the filter by the flow and the filters are held in position by means of a pressure frame.

The requirements of such a filter unit that must be met during operation include stringent requirements in handling during replacement of the filters in order to avoid spreading the collected particulate material. The requirements for the safe removal from a filter housing of spent filters, and their subsequent transportation to a place of disposal, are severe. After a period of use depending upon the particular gas being filtered, its rate of flow, and other variables, the efficiency of a filter becomes reduced to a point which requires its replacement with a new element due to an increase in the pressure drop across the filter. The spent filters which are contaminated with radioactive particles give off radiation which is physiologically harmful so that it must be handled by personnel wearing protective apparel and carefully contained during and after removal from the filter housing. Likewise, the openings in the filter housing enabling loading and unloading of the filters must be enclosed or covered while unloading and loading of the filters proceed, so that no harmful radioactive material can escape to the surroundings.

It is generally the practice to prevent exposure of the spent filters or the interior of the filter housing to the atmosphere, even momentarily. In some situations it is also required that replacement filters be likewise enclosed in a container during loading into and unloading from the filter housing.

OBJECTS OF THE INVENTION

It is the principal object of this invention to provide an improved filter unit comprising a filter housing for holding a HEPA filter.

It is another object of this invention to provide a filter unit for the assured safe loading of filters within a filter forming a part of the filter unit and by which, in an equally assured safe way, contaminated spent filters may be withdrawn from the housing while enclosed within a container means and conveyed to a place of safe disposal, all without any risk of radioactive exposure to operating personnel when the filters are contaminated with radioactive particles.

Another object is to provide a filter unit which, in furtherance of the general object of the invention, makes a removal of a contaminated filter unit facile, rapid and certain, while having means effecting a gas-tight seal between a newly emplaced filter, the filter housing and the associated components of the filter housing.

Still another object of this invention is to provide a filter unit in which the means for receiving and securely holding a filter in the filter housing has indexing studs that must engage apertures in the platform mounted inside the door means movably attached to the filter housing in order for the door means to be moved to a closed position on the filter housing.

Other objects and advantages of this invention will become apparent to a person having skill in the art from reading the following specification and by referring to the drawings.

SUMMARY OF THE INVENTION

The foregoing objects and others are achieved by the present invention of a filter unit adapted for receiving a flow of fluid potentially carrying particulate material and for holding filters transverse to the flow, with one preferred application of the filter unit being for use with flows (e.g., air streams) containing radioactive particles. The filter unit has a generally cubic shaped housing having a fluid inlet opening and a fluid outlet opening in two opposite end surfaces and preferably these openings are flanged for ease of connecting the unit for use. The housing is also provided in its lateral surfaces (or walls) with a first opening and a second opening enabling insertion and removal of filters through these openings. Each opening has a door means mounted to close the opening, with each door means being capable of being opened to a position at least 90° (at right angles) to the lateral surface of the housing on which the door means is mounted. The housing also has a clamping means near the first opening and a clamping means near the second opening for securing each door means associated with the respective opening to the housing to close the associated opening. One door means has attached on its inside surface a platform with two apertures for receiving two indexing studs upon closing and clamping the door to the housing. The other door means has the inside surface forming a filter changing catch pan for collecting and holding particulate material as well as supporting the filter during changing thereof. The housing also has two means for receiving and securely holding filters inside the housing adjacent each opening, and one of the means for receiving and securely holding a filter is a pressure frame means having two indexing studs mounted thereon for engaging respectively the two apertures in the platform.

The pressure frame means is used to hold or clamp the HEPA filter inside the housing adjacent the opening through which the HEPA filter is inserted into the housing and comprises a filter sealing plate affixed inside the housing for holding the filter by supporting the periphery of one face of this filter and two pivotally movable clamping means being affixed opposite each other inside said housing for clamping portions of the filter opposite the filter face on the filter sealing plate. Each clamping means has a fixed member affixed inside the housing to a lateral face of the housing with the fixed member being pivotally connected to a movable member. Movable bolt means is mounted in the outlet end surface of the housing, and the movable bolt means is connected to the movable member for pivotally moving (by raising and lowering) the movable end of the movable member. Each movable member has an indexing stud affixed thereto so that a portion of each stud extends through the opening through which the HEPA filter is inserted and removed so that each stud extends slightly outside the housing.

DESCRIPTION OF THE INVENTION

Figure 1:
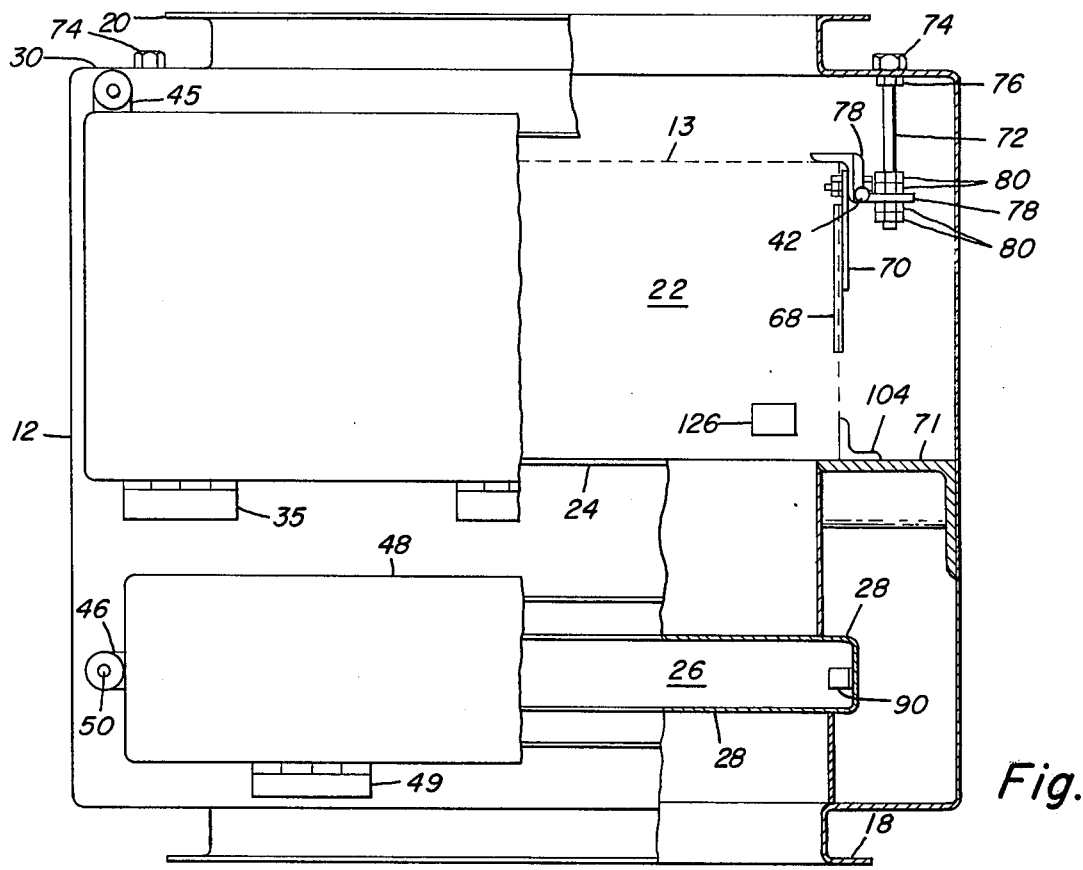
FIG. 1 is a front elevation partial cross sectional view of one embodiment of the filter unit of this invention.
Figure 2:
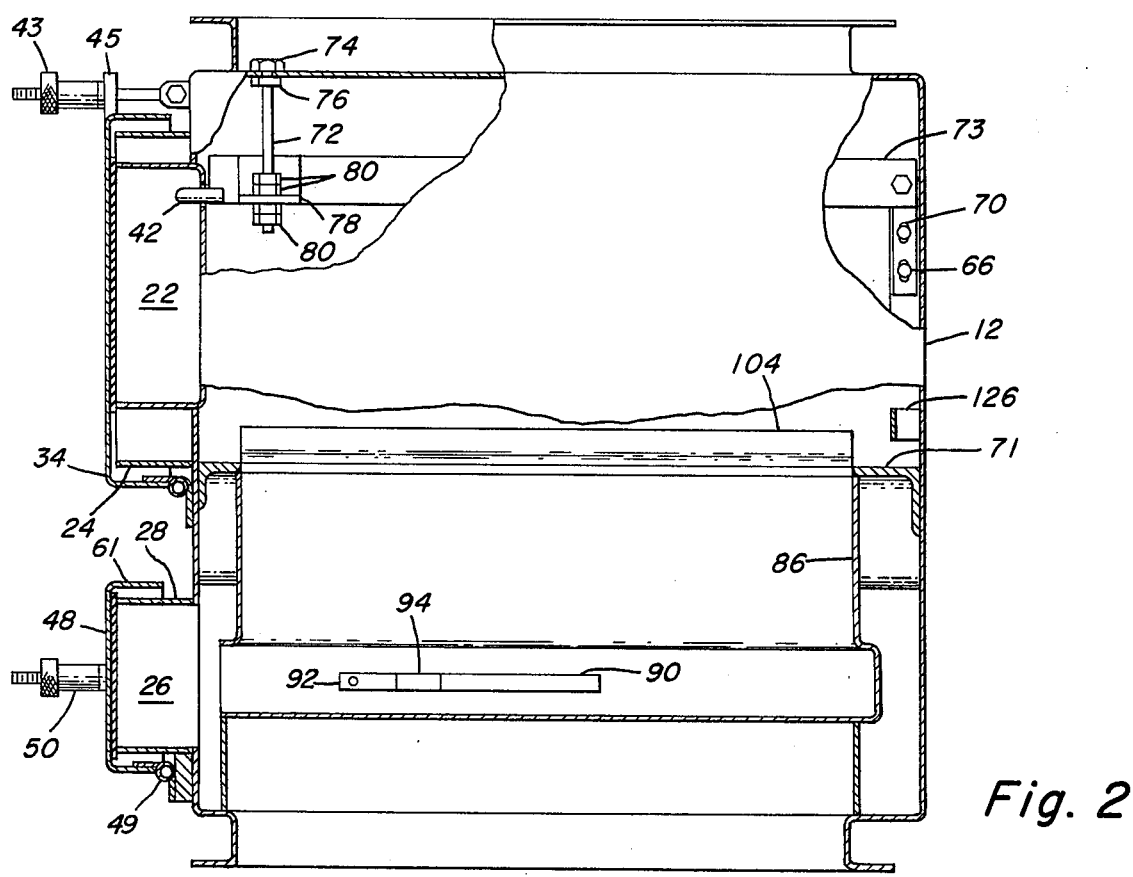
FIG. 2 is a side elevation partial cross sectional view of the filter unit of FIG. 1.
Figure 3:
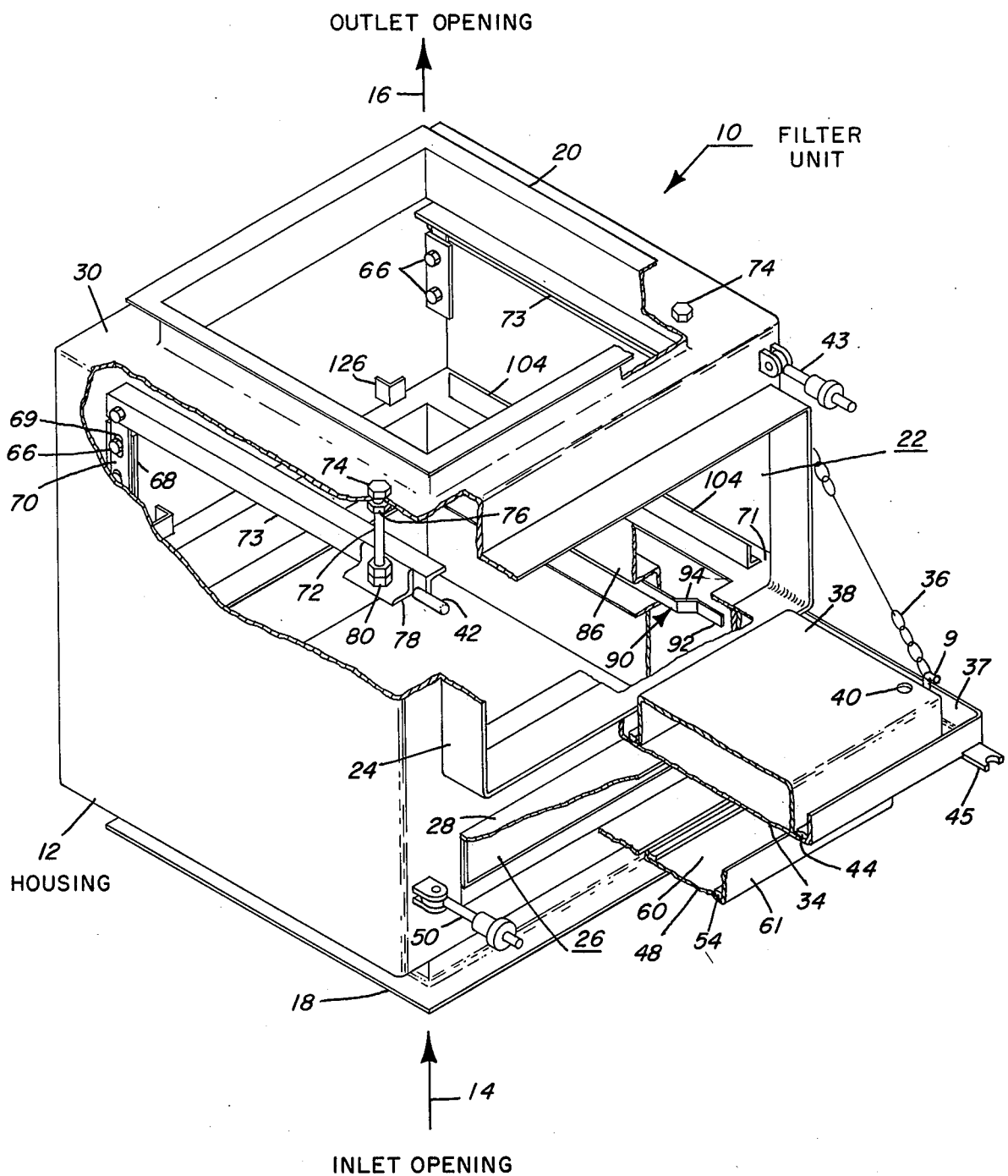
FIG. 3 is an isometric partial cross sectional view of the filter unit of FIG. 1.

Referring now in detail to FIGS. 1-4 and 4A, a filter unit designated as 10 is provided with a generally cubic-shaped housing 12 (preferably made of a metal material such as steel) having a fluid inlet opening 14 and a fluid outlet opening 16 in two opposite end surfaces. The inlet and outlet openings 14 and 16 are provided respectively with flanges 18 and 20, and the housing 12 is thus adapted to the passage of a fluid stream therethrough in the direction shown by the arrows in FIG. 3.

In a preferred embodiment of this invention, the cross section of housing 12 transverse to the flow direction is generally square and housing 12 is also provided in one of its lateral surfaces with a first opening 26 and a second opening 22. While the first and second openings are shown as being in one lateral surface, where needed it is possible to have these openings in different lateral surfaces (e.g., plant areas with restricted access).

Figure 4A:
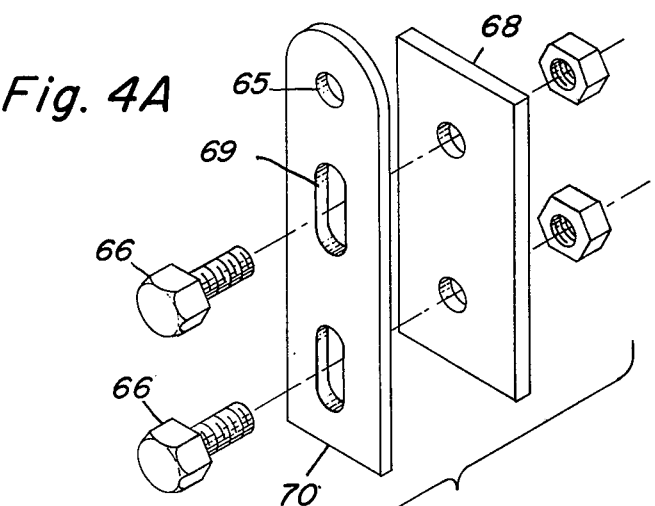
FIG. 4A is an exploded view of a portion of the means for receiving and securely holding a second filter shown in FIG. 4.
Figure 4:
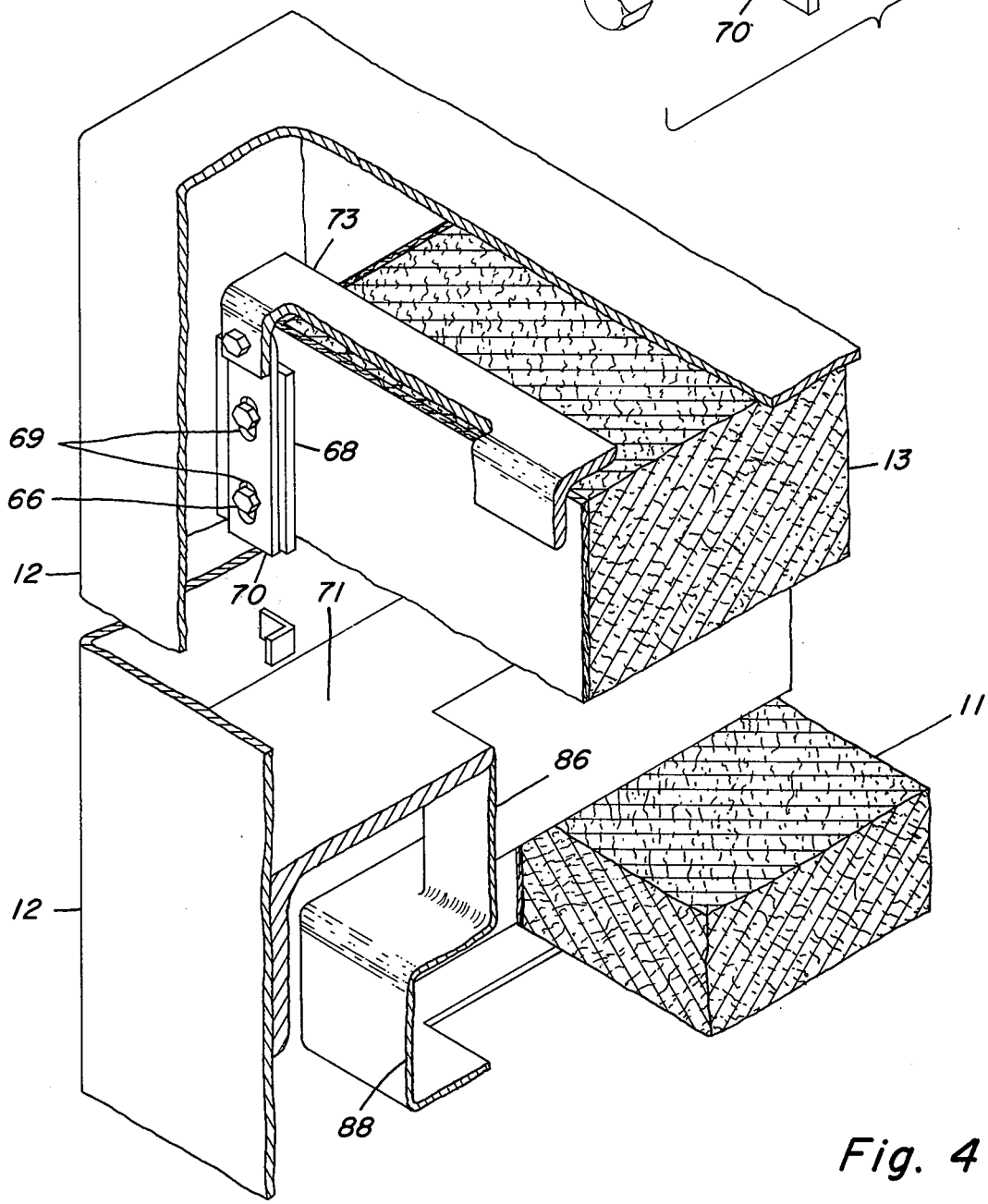
FIG. 4 is an isometric view of a portion of the filter unit and a portion of the means for receiving and securely holding the HEPA filter with the second filter in position inside the housing of the filter unit and a portion of the means for receiving and securely holding a first filter with the first filter in position inside the housing of the filter unit, the unit being the embodiment shown in FIGS. 1-3.

Preferably the first opening 26 (preferably a smaller opening) has a flange 28, and this opening 26 is provided for insertion and withdrawal of a filter such as a preliminary filter or first filter 11 (as shown in FIG. 4). The preliminary filter 11 is typically an inexpensive disposable filter and can be made of a variety of low-cost filtering materials such as cotton, felt, etc., and mounted in an inexpensive frame such as a wood frame or a metal frame. The first filter 11 typically is very thin having two filtering faces and the frame forms the ends of the first filter that are in the direction of fluid flow through the housing 12.

Preferably the second opening 22 (preferably a larger opening) has a flange 24, and this opening 22 is provided for insertion and withdrawal of a filter such as a HEPA filter or second filter 13 (as shown in FIG. 4). The HEPA filter 13 has a glass-asbestos filter medium having high chemical and temperature resistance in use and high strength with elasticity and resiliency and is commercially available from Cambridge Filter Corporation of Syracuse, New York as the Absolute filter and from other companies as well. The HEPA filter 13 is constructed to provide a large area of filtering surface, e.g., more than 50 square feet of effective medium per square foot of face area, and the medium is formed into a closely pleated package with corrugated separators between pleats to support the medium and to allow the air to pass through the entire filtering surface. This gives an unusually large particulate-holding capacity and long service life, and the pleated package is sealed into a modular plywood or metal frame which is capable of easy installation. The second filter 13 typically is relatively thick having two filtering faces, and the frame forms the ends of the second filter that are in the plane of fluid flow through the housing 12.

A first door means (door) 48 is movably mounted to said housing 12 at one edge of said first opening 26 (preferably the edge toward the fluid inlet opening 14) with the mounting typically being achieved by a hinged connection between the housing 12 and the filter door 48 by hinges 49. This mounting enables the door 48 to be raised to a closed position with a first clamping means in the form of door clamps 50 being used to retain the door 48 in a closed position. The lip 61 of door 48 securely fits around the flange 28 of the opening 26 and with gasket 54 of door 48 contacting flange 28 when door 48 is in its closed position, there is an air-tight closure of the opening 26 to retain particulate material within the filter unit 10 and prohibit the passage of fluid either into or out of opening 26. The hinges 49 are of limited movement so that door means 48 is preferably about 90° to the connected lateral surface of the housing 12 when the door 48 is in its open position. The inside surface 60 and lip 61 of door 48 define a filter changing catch pan providing a surface for temporarily collecting and holding particulate material that can fall from a spent or used preliminary filter 11 during removal of the filter from the filter unit. In addition the catch pan advantageously supports the preliminary filter 11 during insertion of such a filter 11 into the housing 12 and during withdrawal of such a filter 11 from the housing 12. The first filter door means 48 has two brackets 46 (shown in FIG. 1) with one bracket 46 being positioned on each side of door 48 in a position to receive a first clamping means in the form of the door clamp 50 and in such a manner form a tight connection of the door 48 with the housing 12.

Flange 28 on the opening 26 of the filter housing 12 permits sealing a container around the flange 28 to prevent spread of contamination during changing of the filter 11 if desired or required such as for radioactive contamination. As previously noted, the door 48 is hinged to the filter housing 12 and this enables the door to be substantially parallel to the filter 11 during insertion and withdrawal of the filter 11 from housing 12 through the first opening 26. This inside surface of the door 48 also provides a working platform or surface for changing of the preliminary filter 11.

A second door means (door) 34 is movably mounted to said housing 12 at one edge of said second opening 22 (preferably the edge toward the fluid inlet opening 14) with the mounting typically being achieved by a hinged connection between the housing 12 and the door 34 by hinges 35. This mounting enables the door 34 to be raised to a closed position with a second clamping means in the form of door clamps 43 being inserted in bracket 45 to retain the door 34 in a closed position. The lip 37 of the door 34 securely fits around the flange 24 of the opening 22 and with gasket 44 of door 34 contacting flange 24 when the door is closed there is an air-tight closure of the opening 22 to retain particulate material within the filter unit 10 and prohibit the passage of fluid either into or out of the opening 22. This second door 34 has retaining means 36 in the form of a flexible wire or a link chain connected to curved rod 9 attached to lip 37 of door 34 and to the housing 12, and this retaining means 36 retains the door 34 at about 90° to the lateral surface of the housing 12 when the door 34 is in its open position. Connected inside the door 34 is a filter change platform 38 providing a surface for temporarily supporting a filter such as a HEPA filter 13 (as shown in FIG. 4) during insertion of such a filter 13 into the housing 12 and during withdrawal of such a filter 13 from the housing 12. This platform has two apertures 40 therein, here shown as circular holes 40, capable of receiving insertion of indexing studs. The use of door clamps 43 on brackets 45 ensures a temporary and firm locking of the door 34 in its closed position against the housing 12 thus preventing accidental opening of the door 34.

Flange 24 on the opening 22 of the filter housing 12 permits sealing a container around the flange 24 to prevent spread of contamination during changing of the HEPA filter 13. As previously noted the door 34 is hinged to the filter housing 12 and held by retaining means 36 in its open position and this enables the platform 38 to be substantially parallel to the filtering face of the HEPA filter to be inserted into and withdrawn from opening 22 of housing 12. This platform 38 provides a working platform or surface for changing of the HEPA filter and further assures that the filter is fully inserted through the second opening 22 and into the filter housing 12 before the door 34 can be closed and secured to housing 12.

Inside the housing 12 of the filter unit 10 are two means for receiving and securely holding filters inside the housing adjacent the openings, and one of the means for receiving and securely holding a filter is a pressure frame means having two indexing studs mounted thereon for engaging respectively the two apertures 40 in the platform 38 of the door 34.

The means for receiving and securely holding a first filter inside the housing 12 adjacent the opening 26 is comprised of a channel member (channel) 88 that has attached extension 86 connected to filter sealing plate 71 and filter sealing plate 71 is connected to filter housing 12. Channel member 88 starts to run from one end of opening 26 and goes around inside the housing 12 in a plane perpendicular to the flow direction at a distance removed from the housing 12 as shown in FIG. 4 and stops at the other end of opening 26 leaving opening 26 free for insertion of a filter 11 therethrough. The channel member 88 is of narrow width and supports a small portion of the periphery of the opposite filtering faces of the filter 11. Two resilient pressure exerting members 90 are mounted opposite each other in channel 88 so when a filter 11 is inserted into channel 88 each member 90 exerts pressure on filter 11 in a direction opposite to the other member 90 in a plane perpendicular to the flow direction through housing 12. This secures the filter 11 in channel 88 and prevents undesired movement or vibration of the filter 11.

The two pressure exerting members 90 are metal strips with one end 92 being fixed to the channel 18 by a weld or a rivet with a portion 94 being bent away from the housing 12 so that the unattached end is parallel to the housing and removed a small distance from the housing 12 serving to exert a moderate amount of pressure on the filter 11 when the filter 11 is inserted through opening 26 into channel 88.

One embodiment of the means for receiving and securely holding the HEPA filter 13 is the pressure frame means shown in FIGS. 1–4 and 4A adjacent the opening 22 and affixed inside housing 12. One component of the pressure frame means is a filter sealing plate 71 affixed to the housing 12 for supporting the periphery of one face (filtering face) of the HEPA filter 13, and this filter sealing plate 71 forms a seal with the HEPA filter 13 so no fluid or particulate material bypasses this filter 13. Guide means 104 is affixed to the filter sealing plate 71 for guiding the filter 13 during insertion through the opening 22 into housing 12. Two pivotally movable clamping means are provided for clamping opposite end portions of one face of the filter 13 opposite the face in contact with the filter sealing plate 71, and each clamping means has a fixed member 69 being affixed to the filter housing 12, here on the lateral surface of the housing 12 opposite the lateral surface with opening 22. Each fixed member 68 is pivotally connected to one end of a movable member (movable angle member) 73, and the other end of movable member 73 closest opening 22 is connected to a movable bolt means (bolt) 72 mounted in the outlet end surface 30 of the housing 12 and capable of raising and lowering the movable member 73 upon turning bolt means 72 so that movable member 73 respectively is removed from contact with the HEPA filter 13 and moved into a pressure contact with filter 13. Each movable member 73 has connected on the end adjacent opening 22 a cylindrical indexing stud 42.

When desired the position of each movable member 73 is adjustable in the direction of flow through the housing 12 for variations in filter size since each fixed member 68 with circular holes 67 is bolted to an adjustable member 70 having elongated holes 69 by bolt-and-nut means 66. The upper hole 65 in adjustable member 70 is pivoted to movable member 73.

The bolts 72 have a head nut 74 enabling turning of the bolt 72 external to the housing 12 for pivotally raising and lowering the angle piece 78 connected to the movable end of member 73. A spacer nut 76 is affixed to the inside surface of housing 12, and the angle piece 78 at the threaded end of bolt 72 is held with washers on each side between two sets of double nuts 80 (e.g., a hexagonal nut and a jaw nut). Each bolt 72 can be turned sufficiently to enable pivoting of movable members 73 during removal of a contaminated (or used) HEPA filter 13 and insertion of a new HEPA filter 13, and when the filter 13 is in place each bolt 72 is turned to move movable members 73 securely in contact with the HEPA filter 13 and secure the adjacent face of HEPA filter 13 in position between the two movable members 73.

It is to be emphasized that HEPA filter 13 must be properly secured in place in housing 12 so that movable members 73 are in place and the indexing studs 42 will enter the respective apertures 40 in panel 38 of door means 34 for it to be possible to close and to secure firmly the door 34 to the housing 12 thus closing or sealing the opening 22. Also in the event personnel fail to secure the HEPA filter 13 properly, leaving a portion of the filter within the volume surrounded by the flange 24 of opening 22, it will not be possible for the personnel to close and secure the filter door 34 since the platform 38 will encounter the filter prior to the door 34 being properly closed. This assures that personnel will properly insert the HEPA filter 13 into the housing 12 in order to be able to close and tightly secure door 34.

In operation the filter unit 10 is on line so that a conduit providing a flow of a particulate laden gas stream (such as an air stream) is connected to the fluid inlet opening 14 of the filter unit 10 and another conduit for receiving a flow of the gas stream after passing through the filter unit is connected to the fluid outlet opening 16 of the filter unit. The operation proceeds until there is sufficient collection of the particles from the particulate laden gas stream and there is a suffiient pressure drop across the filter unit necessitating a change of at least one of the filters in the filter unit. In practice it has been discovered that the preliminary filter 11 usually requires more frequent changes than does the high efficiency particulate air filter 13.

When the HEPA filter 13 has to be changed, the door means 34 is opened and a container is placed around flange 24 and sealed to the flange 24. The spent HEPA filter is then unclamped by raising members 73 and pulled out into the container. The container, with the spent second filter 13 enclosed and laying on platform 38, is sealed at a place between the spent second filter 13 and the flange 24, and then the container is separated from flange 24 and removed for disposal. A new second filter is inserted into opening 22 and placed in the means for receiving and securely holding the second filter (pressure frame means) and fixed in place by movable members 73. It has been found that no container is necessary for the insertion of the new second filter 13 since there is substantially no build up of particulate material on the inside surface of housing 12.

Figure 5:
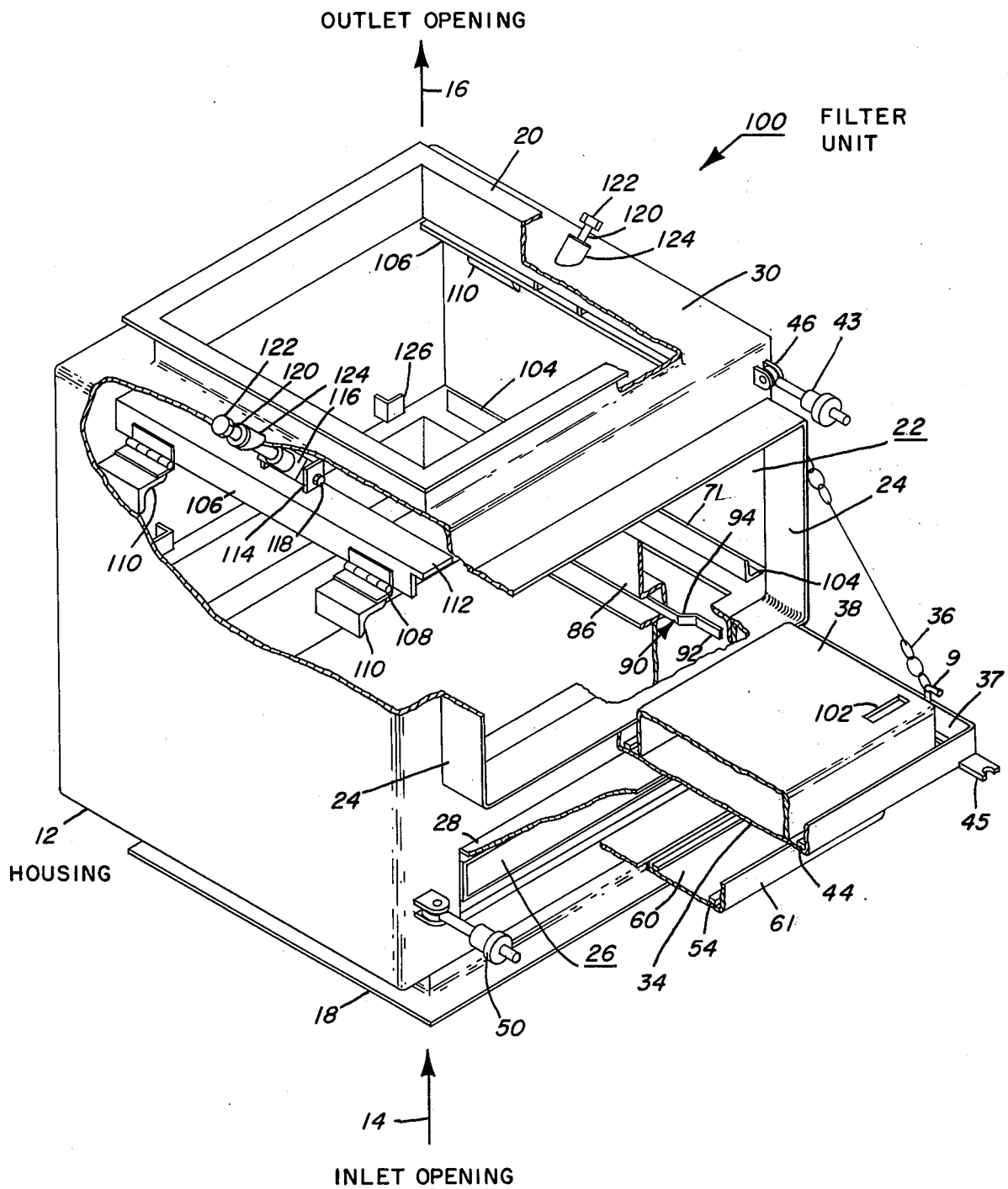
FIG. 5 is an isometric partial cross sectional view of another embodiment of the filter unit of this invention.
Figure 6:
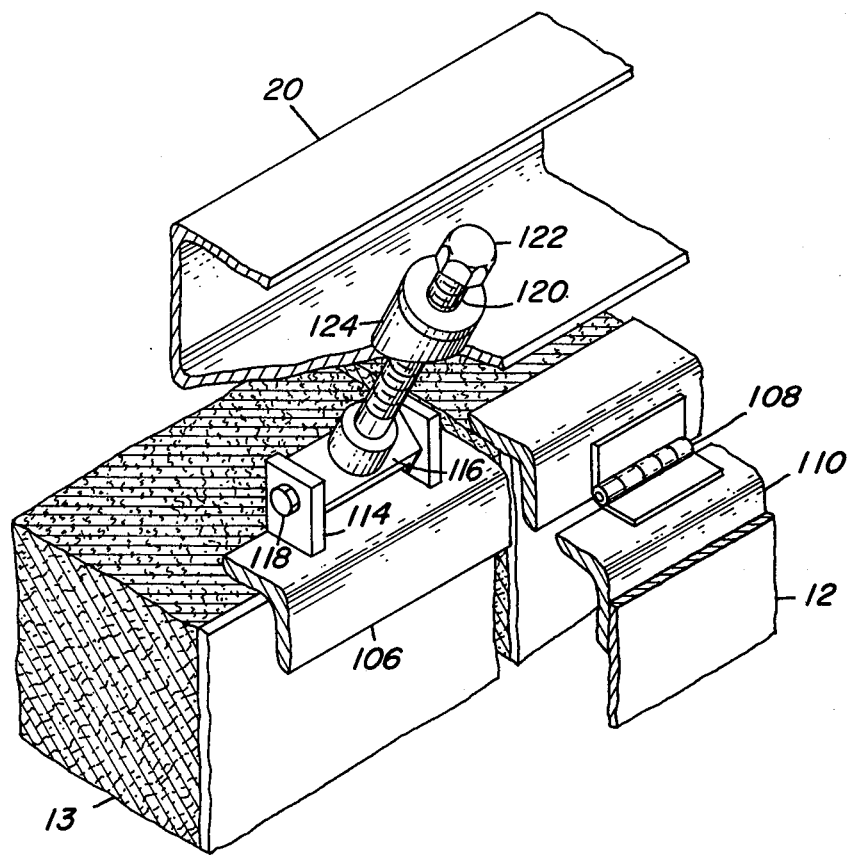
FIG. 6 is an isometric view of a portion of the embodiment of FIG. 5 showing the means for receiving and securely holding a second filter with the second filter in position inside the housing of the filter unit.

Another embodiment of the filter unit of this invention is presented in FIG. 5 in an isometric view of the filter unit 100 that is partially in section and in FIG. 6. In FIGS. 5 and 6 all components numbered with the same numbers in FIGS. 1–4 and 4A are the same component with the same function and new numbers not found in FIGS. 1–4 and 4A represent new components for this embodiment. In this embodiment, there is an aperture 102 in the panel 38 of the second door means 34 that is rectangular. In this embodiment there is another pressure frame means used to hold or fix the HEPA filter in position inside the housing 12 adjacent the opening 22. One component of the pressure frame means is a filter sealing plate 71 affixed to the housing 12 for supporting the periphery of one face (filtering face) of the HEPA filter 13, and this filter sealing plate 71 forms a seal with the HEPA filter 13 so no fluid or particulate material bypasses this filter 13. Guide means 104 is affixed to the filter sealing plate 71 for guiding the filter 13 during insertion through the second opening 22 into housing 12. Two pivotally movable clamping means are provided for clamping opposite peripheral portions of one face of the filter 13 opposite the face in contact with the filter sealing plate 71, and each clamping means has two fixed members (angle members) 110 being affixed to the filter housing 12, here on the lateral surfaces of the housing 12 adjacent the lateral surface having opening 22. Each fixed member 110 is pivotally connected near one end of a movable member (movable angle member) 106, and movable member 106 is pivotally connected to a movable bolt means (bolt) 120 mounted in the outlet end surface 30 of the housing 12 for pivotally raising and lowering the movable member 106 so that movable member 106 respectively is removed from contact with the filter 13 and moved into a pressure contact with filter 13. Each movable member 106 has connected on the end adjacent opening 22 an indexing stud 112 that has a rectangular cross section. Each movable member has tabs 114 that are attached to a bracket 116 by bolt 118 to form a pivotal connection with each of said brackets 116 being connected to a separate bolt 120 mounted in the housing 12 by a nut mounting 124 with each of said bolts 120 being capable of raising or lowering its connected movable member 106, and with the bolts 120 being capable of a small amount of pivot in the nut mounting 124 as its connected member 106 is raised or lowered.

The bolts 120 have a head nut 122 enabling turning of the bolt 120 external to the housing 12 for raising or lowering connected movable member 106. The bracket 116 is threaded so that as bolt 120 is turned bracket 116 is raised or lowered in response to the bolt 120. Each bolt 120 can be turned sufficiently to enable lifting of bracket 116 and connected movable member 106 during removal of a contaminated (or used) HEPA filter 13 and insertion of a new HEPA filter 13, and when filter 13 is in place each bolt 120 is turned to secure the movable members 106 in position on the HEPA filter 13 so that the filter 13 is held in position between the two movable members 106. It is to be emphasized that HEPA filter 13 must be properly secured in place in housing 12 so that movable members 106 are in place and the indexing studs 112 will enter the respective apertures 102 in panel 38 of door means 34 for it to be possible to close and to secure firmly the door 34 of the housing 12 thus closing or sealing the opening 22. Also in the event personnel fail to secure the HEPA filter properly, leaving a portion of the filter within the volume surrounded by flange 24 of the opening 22, it will not be possible for the personnel to close and secure the filter door 34 since platform 38 will encounter the filter prior to the door 34 being properly closed. This assures that personnel will properly insert the HEPA filter 13 into the housing 12 in order to be able to close and tightly secure door 34.

Where it is desired to make certain that the second filter 13 is not inserted too close to the lateral surface of the housing 12 opposite opening 22 one or more filter stops 126 are provided and are attached to the housing 12 above the filter sealing plate 71. This assures proper placing of the filter 13 during changing of this filter.

The filter unit of this invention offers several unique features and advantages not available in prior filter units. When the HEPA filter is inserted into the filter unit, the periphery of one face of the HEPA filter seals with the filter sealing plate 71, and this eliminates any powder buildup on the frame of the HEPA filter and inside the filter housing. The door closing the opening receiving the HEPA filter has a filter change platform serving as a working platform during filter changes. The door closing the opening receiving the HEPA filter also has this platform to assure that the HEPA filter is in place before the door can be closed, and this door cannot be closed unless the filter is clamped down so indexing studs on the pressure frame means for holding the HEPA filter will enter apertures in the platform inside this door. The first door means closing the opening receiving the preliminary filter serves as a catch pan when the door is opened for changing the preliminary filter. The housing of the filter unit is designed to enable stacking of two or more filter units together to form multiple banks of such units.

As will be apparent to those skilled in the art, various modifications and changes may be made in the invention described herein. It is accordingly the intention that the invention be construed in the broadest manner within the spirit and scope as set forth in the accompanying claims.

What is claimed is:
1. A filter unit adapted for receiving a flow of fluid and for holding filters transverse to said flow, comprising in combination,
   a. a housing having a fluid inlet opening and a fluid outlet opening in two opposite end surfaces for passage of said flow of fluid therethrough, said housing having in its lateral surfaces a first opening and a second opening,
   b. a first door means being movably mounted to said housing at one edge of said first opening and closing said first opening when said first door is in its closed position,
   c. first clamping means being attached to said housing and being adapted to engage and secure said first door means as closed over said first opening,
   d. a second door means being movably mounted to said housing at one edge of said second opening and closing said second opening when said second door is in its closed position, said second door means including a filter change platform mounted inside said door with two apertures therein adapted to receive indexing studs,
   e. second clamping means being attached to said housing and being adapted to engage and secure said second door means as closed over said second opening,
   f. means for receiving and securely holding a first filter inside said housing adjacent said first opening for filtering said flow,
   g. means for receiving and securely holding a second filter inside said housing adjacent said second opening for filtering said flow, and
   h. two indexing studs being affixed to said means for receiving and securely holding said second filter, said studs extending through said second opening and engaging respectively said two apertures in said second door means when said second door means is in its closed position.

2. A filter unit according to claim 1 in which said first opening and said second opening are in one lateral face of said housing.

3. A filter unit according to claim 1 in which said first and second openings are flanged and said doors have seals mating with said flanges when said doors are in their closed positions.

4. A filter unit according to claim 1 in which said first door means includes a filter changing catch pan providing a surface for collecting and holding particulate material.

5. A filter unit according to claim 1 in which said first door means and said second door means are hingedly mounted to said housing.

6. A filter unit according to claim 1 in which a first filter is held in said means for receiving and securely holding said first filter and comprises a disposable preliminary filter.

7. A filter unit according to claim 1 in which a second filter is held in said means for receiving and securely holding a second filter and said second filter comprises a high efficiency particulate air filter.

8. A filter unit according to claim 1 in which said indexing studs are cylindrical in cross section and said apertures in said filter change platform are circular.

9. A filter unit according to claim 1 in which said indexing studs are rectangular in cross section and said apertures in said filter change platform are rectangular.

10. A filter unit according to claim 1 in which at least one filter stop is mounted inside said housing on the lateral face opposite said second opening in said housing.

11. A filter unit according to claim 1 in which the means for receiving and securely holding the second filter inside said housing adjacent said second opening for filtering said flow is a pressure frame means comprising
   i. a filter sealing plate being affixed inside said housing for supporting the periphery of one face of said filter, and
   ii. two pivotally movable clamping means being affixed opposite each other inside said housing for holding portions of the filter opposite the face of said filter in contact with the filter sealing plate so said filter is clamped to said sealing plate, each clamping means comprising
      a. a fixed member affixed to a lateral face of said housing, said fixed member being pivotally connected to
      b. a movable member, said movable member being connected to
      c. a movable bolt means mounted in said housing, said bolt means being capable of raising and lowering the pivotable end of said movable member.

12. A filter unit according to claim 11 in which each fixed member is affixed to the lateral face of said housing opposite the lateral face of said housing containing said second opening.

13. A filter unit according to claim 11 in which there are two fixed members pivotally connected to each movable member and each set of two fixed members are affixed to one of the two lateral faces of said housing abutting the lateral face of said housing containing said second opening.

14. A filter unit according to claim 1 in which the means for receiving and securely holding a first filter inside the housing comprises a channel being connected to said housing with the channel corresponding in size to said first opening in said housing and said channel being capable of holding and supporting the periphery of the two filtering faces of said filter and a substantial portion of the frame of said filter.

15. A filter unit according to claim 14 in which there is mounted two resilient pressure exerting members in the channel holding and supporting the first filter so that the members are opposite each other and upon insertion of the first filter each member exerts pressure on said first filter.

16. A filter unit adapted for receiving a flow of fluid potentially containing solid radioactive particles and for holding filters transverse to said flow, comprising in combination,
  a. a housing having a fluid inlet opening and a fluid outlet opening in two opposite end surfaces for passage of said flow of fluid therethrough, said housing having in its lateral surfaces a first opening and a second opening,
  b. filter receiving and holding means being affixed inside said housing and positioned to receive a first filter inserted through said first opening into said filter receiving and holding means,
  c. two resilient positioning means being affixed to said filter receiving and holding means in a position to clamp said first filter between said resilient positioning means upon insertion of said first filter into said filter receiving and holding means,
  d. pressure frame means being affixed inside said housing and positioned to receive a second filter inserted through said second opening, said pressure frame means comprising
    i. a filter sealing plate being affixed inside the housing for supporting the periphery of one face of the second filter,
    ii. guide means being affixed to said filter sealing plate for guiding insertion of a filter through the second opening,
    iii. two pivotally movable clamping means being affixed opposite each other inside said housing for holding portions of the second filter opposite the face of said filter in contact with the filter sealing plate so said filter is clamped to said sealing plate, each clamping means comprising
      a. a fixed member affixed to a lateral face of said housing, said fixed member being pivotally connected to
      b. a movable member having an indexing stud, said movable member being connected to
      c. a movable bolt means mounted in said housing, said bolt means being capable of raising and lowering the pivotal end of said movable member,
  e. a first door means being movably mounted to said housing at one edge of said first opening, said first door closing off said first opening in said housing in a closed position and in an open position permitting withdrawal of said first filter through said first opening,
  f. first clamping means being attached to said housing and being capable of being connected to said first door to close said first door over said first opening,
  g. a second door means being movably mounted to said housing at one edge of said second opening, said second door means having a filter change platform mounted inside said door with two apertures in said platform for receiving said indexing studs and said second door closing off said second opening in said housing in a closed position and in an open position said second door permitting withdrawal of said second filter through said second opening, and
  h. second clamping means being attached to said housing and being capable of being connected to said second door to close said second door over said second opening.

17. A filter unit according to claim 16 in which each fixed member is affixed to the lateral face of said housing opposite the lateral face of said housing containing said second opening.

18. A filter unit according to claim 16 in which there are two fixed members pivotally connected to each movable member and each set of two fixed members are affixed to one of the two lateral faces of said housing abutting the lateral face of said housing containing said second opening.

19. A filter unit according to claim 16 in which said first opening and said second opening are in one lateral face of said housing.

* * * * *